Figure 1:
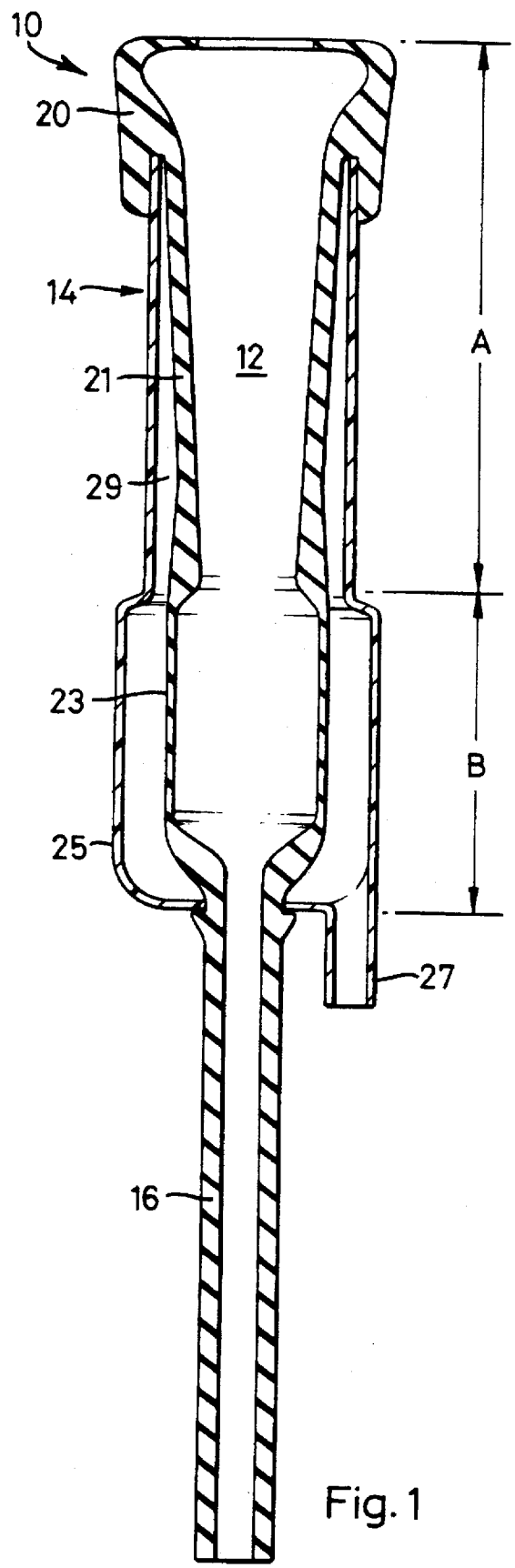

United States Patent [19]
Grindal

[11] Patent Number: 5,666,904
[45] Date of Patent: Sep. 16, 1997

[54] AUTOMATIC MILKING APPARATUS

[75] Inventor: Robert Joseph Grindal, Reading, England

[73] Assignee: British Technology Group Limited, London, England

[21] Appl. No.: 432,166

[22] PCT Filed: Nov. 19, 1993

[86] PCT No.: PCT/GB93/02378

§ 371 Date: May 8, 1995

§ 102(e) Date: May 8, 1995

[87] PCT Pub. No.: WO94/12018

PCT Pub. Date: Jun. 9, 1994

[30] Foreign Application Priority Data

Nov. 27, 1992 [GB] United Kingdom ............ 9224890

[51] Int. Cl.⁶ ...................................................... A01J 5/06
[52] U.S. Cl. ...................................... 119/14.02; 119/14.49
[58] Field of Search ......................... 119/14.02, 14.47, 119/14.48, 14.49, 14.5, 14.51, 14.52, 14.53

[56] References Cited

U.S. PATENT DOCUMENTS

| | | | |
|---|---|---|---|
| 1,388,380 | 8/1921 | Schmitt | 119/14.49 |
| 2,687,112 | 8/1954 | Shurts | 119/14.5 X |
| 3,158,136 | 11/1964 | George | 119/14.52 |
| 3,234,906 | 2/1966 | Jensen | 119/14.02 |
| 4,803,950 | 2/1989 | Griffin et al. | 119/14.55 |
| 5,161,482 | 11/1992 | Griffin | 119/14.02 |

FOREIGN PATENT DOCUMENTS

| | | | |
|---|---|---|---|
| 892824 | 8/1982 | Belgium . | |
| 124118 | 11/1984 | European Pat. Off. | 119/14.49 |
| 459817 | 12/1991 | European Pat. Off. . | |
| 2107565 | 5/1983 | United Kingdom . | |
| 8606580 | 11/1986 | WIPO . | |

*Primary Examiner*—Robert P. Swiatek
*Attorney, Agent, or Firm*—Cushman, Darby & Cushman IP Group of Pillsbury Madison & Sutro LLP

[57] ABSTRACT

A teat cup liner (10) for use in hydraulic milking apparatus, comprises an upper section (20,21) adapted to encircle the teat without collapse on the teat end during milking, and a relatively flexible lower section (23) located beneath and spaced from the teat end and adapted to open and close during the pulsation cycle.

10 Claims, 1 Drawing Sheet

AUTOMATIC MILKING APPARATUS

The present invention relates to automatic milking apparatus and, in particular, but not exclusively, to hydraulic milking apparatus.

All hydraulic milking apparatus includes a cluster of four teat cups and a one-way valved clawpiece with the requirement that the various components should be constructed to avoid the introduction of air into the milk flow upstream of the one-way valves. In addition to the teat cups and the clawpiece mentioned above, other important components of the apparatus include a pulsator, four short milk tubes connecting the liner cores with the clawpiece, and a suction pump.

Each teat cup in the apparatus described above comprises a rigid outer casing containing a flexible liner which fits over one of the cow's teats. The annular space between the liner and the casing is called the pulsation chamber.

The suction pump acts via the valved clawpiece to apply a suction of typically 35 to 50 kPa to the liner cores when the clawpiece valves are open, the actual value in this range depending on the height of the milk jar or pipeline downstream of the clawpiece.

Apart from encouraging a flow of milk into the liner core and beyond, this suction is also effective to clamp the teat liner on to the teat ('adhesion').

The pulsator is connected up to vary the vacuum in the annular pulsation chamber between a first longer-maintained value of 50 kPa (i.e. half atmospheric pressure) and a second shorter-maintained value of zero kPa (i.e. atmospheric pressure).

The pressure differential acting across the walls of the liner will vary in response to differences within the pulsation chamber and the liner core to produce a liner-closing phase, a liner-closed phase, a liner-opening phase, and, providing sufficient milk is available in the cycle, a "liner-open" phase in which the liner is fully open.

When the pulsation chamber approaches zero vacuum (atmospheric pressure) during the liner-closing phase, the liner core collapses on to the teat end and the compressive load on the teat end either alone, or in combination with the (small) vacuum level in the liner core, temporarily prevents the flow of milk through the teat duct.

During the liner closing phase, the collapse of the liners results in a relatively small vacuum in the liner cores (less than 5 kPa) which enables the one-way clawpiece valves to open in response to the greater vacuum being applied at their downstream sides by the suction pump. This allows an uninterrupted column of milk to flow rapidly from the liners to the clawpiece bowl and, optionally, beyond.

This column of milk has considerable kinetic energy and as it comes to rest (when the liner fully closes) it acts like a piston to pull a vacuum of up to 90 kPa in the liner core. At this point, the pressure differential across the clawpiece valves will have reduced sufficiently for the valves to close under their own weight. This will prevent any return of milk from the clawpiece bowl to the liner during the subsequent liner-opening phase of the milking cycle.

There comes a point in each liner-opening phase, however, when the increasing vacuum level in the pulsation chamber, the strain energy stored in the collapsed liner, and the increase in teat volume due to the build up of milk in the teat, all combine to overcome and relieve the compression load on the associated teat end. This, together with the flow-enhanced vacuum levels described above and now present in the liner core (up to 90 kPa), causes (i) milk to flow from the teat, (ii) the high vacuum within the liner to be relieved, and (iii) the liner to open.

It is to be noted that the clawpiece valves which are closes during the liner-opening phase, remain closed until the next liner-closing phase when, as above described, the relatively small core vacuums produced by the collapsing liners once again allow the clawpiece valves to open and milk to flow into the clawpiece bowl.

One of the advantages expected of all hydraulic milking systems is that the higher mean vacuum levels generated within the liner cores (as averaged over the duration of the liner-opening and liner-open phases), should lead to significantly increased flow rates compared to those available with conventional milking. However, it has now been found that the full effect of these enhanced core vacuums is to some extent negated by the fact that milk flow from the teats is restricted until the correspondingly increased "grip" of the collapsed liners is finally overcome. Only then is there unrestricted flow of milk from the teats.

Turning now to the possible harmful effects of applying a high mean overall vacuum level to the liner core over a complete milking, it has been discovered that such vacuums often lead to the formation of teat lesions either directly and/or as a result of the correspondingly increased friction between the teat ends and the collapsing liners during opening and closing of the liner.

In addition, the pressure differentials produced across the liner walls when the flow-enhanced core vacuums are periodically opposed by atmospheric pressure in the pulsation chambers, can lead to high compressive loads being intermittently applied to the teat ends. This repeated compression of the teat end throughout the milking process often results in teat orifice hyperkeratosis.

The continuous application of the compressive loads towards the end of milking (when the core vacuum is unrelieved by any significant flow of milk from the teats) can also lead to significant teat end damage over a prolonged period.

It should be pointed out that the magnitude of these drawbacks depends to some extent on the milking speed and teat length of the cows concerned. They may be particularly severe with a slow-milking cow, for example, where it may never be possible for the cow to provide milk at a high enough rate to stop unacceptably high vacuum levels building up in the liner cores.

Similarly, if a cow has long teats, the volume of liner left to accept the milk from the teats is correspondingly small and it takes only a small quantity of milk for the liner to open. If such a cow is also fast milking, the liner open position is reached in a very short time at which point the strain energy within the liner wall is lost and subsequent milk flow from the teat passes the clawpiece valve. As a result, the vacuum level within the open liner declines from an initial 50 to 55 kPa, say, (just prior to complete liner opening) from 25 to 35 kPa when the liner is fully open. This reduces the flow rate of milk from the teat for this portion of the liner-open phase of the cycle.

Figure 2:
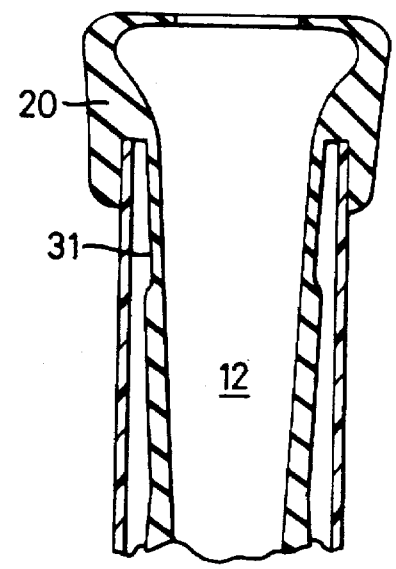

International Application WO-A-8 606 580 (Goldberg) discloses a teat cup liner having an upper ribbed section. FIG. 1 of WO-A-8606580 shows this section collapsed on to the teat to apply a lateral flow-preventing pressure to the teat end. FIG. 3 shows the liner deformed to seal the teat end from the vacuum source. In practice, as will be evident to the man skilled in the art, FIGS. 2 and 3 show hypothetical situations which cannot be achieved in practice; firstly, because a cow's teats stretch by about 40% when under vacuum with the result that they will extend into the lower more flexible region of the liner and secondly, because the complete seal shown in FIG. 3 of WO-A-8606580 is impossible to achieve in practice so that lateral liner pressure applied to the teat end is a necessary functional requirement of the Goldberg liner.

It is an object of the invention to provide a means for arriving at a hydraulic milking system which will have a high milk flow for acceptable teat end pressures and will be effective with both fast and slow milking cows and long and short teats.

According to a first aspect, the present invention comprises, for use in hydraulic milking apparatus, a teat cup liner comprising an upper section (extending from the top of the liner downwards) adapted to encircle the teat with at least the lower portion of said upper section sufficiently inflexible not to collapse on the teat end during milking, and a relatively flexible lower section (extending from the bottom of the liner upwards to the upper section) which lower section is located beneath and spaced from the teat end and is adapted to open and close during the pulsation cycle, but not to collapse on the teat end.

Thus with the teat cup liner of the present invention, no potentially harmful high compressive loads are exerted on the teat ends during hydraulic milking. This in turn leads to milk flow from the teat being initiated at a lower vacuum threshold thereby preventing teat-damaging high levels of vacuum occurring within the liner. In addition, avoiding the permanent collapse of the liner on the teat end at the end of milking, effects more complete milking and minimises the volume of residual milk remaining in the udder during milking.

Conveniently, the upper section of the liner is at least 100 mm long so as to be able to accommodate the large majority of teats, although values of between 110 mm and 120 mm are normally preferred. If use of the apparatus on teats longer than 120 mm seems likely, then the upper liner section should be of a correspondingly greater length.

Conveniently, the upper section of the liner defines a downwardly tapering bore e.g., subtending an included cone angle of between 5° and 10°.

In a preferred embodiment, the upper section of the liner includes a flexible part adjacent to the liner mouthpiece and adapted to displace In response to changes in the pulsation chamber (between vacuum and atmospheric pressure) to enhance liner adhesion, to provide a degree of teat stimulation and to encourage blood flow within the teat.

Conveniently, the core diameter of the lower liner section is greater than the core diameter of the preceding portion of the liner. Typically, for example, the internal volume of the lower section might lie in the range 25 cc to 40 cc.

According to another aspect, the invention comprises a teat cup having a liner according to the present invention and a correspondingly profiled rigid casing in which the liner is housed.

Conveniently, the core diameter of the lower casing section is greater than the core diameter of the preceding portion of the casing to avoid liner/casing contact during liner collapse (when the liner distorts from its initial circular cross-section).

According to another aspect, the invention comprises hydraulic milking apparatus including a cluster of teat cups according to the present invention.

According to a further aspect, the invention comprises a method of hydraulic milking including the step of periodically reducing the amount of vacuum in a liner core to near atmospheric pressure (e.g. typically, around 5 kPa) thereby to inhibit a flow of milk from a cow's teat without collapse of the liner on to the teat end.

Preferred embodiments of the present invention will now be described, by way of example only, with reference to the accompanying drawing in which:

FIG. 1 shows a vertical section of a teat cup assembly according to the present invention drawn accurately to scale; and FIG. 2 shows a vertical section of the top part of an alternative embodiment (accurately drawn to the same scale as FIG. 1).

Thus referring first to FIG. 1 of the drawing, a teat cup assembly 10 according to the present invention comprises a rubber teat cup liner 12 partially enclosed therein a rigid cylindrical metal casing 14.

The liner 12, which in the illustrated example is optionally formed as one piece with the short milk tube 16, includes an upper section (comprising a mouthpiece part 20 and a barrel part 21 of downwardly-tapering bore) and an internally expanded lower section 23 (housed in a similarly expanded lower section 25 of the casing 14). In the illustrated embodiment, the inner surfaces of part 21 lie on a conical surface of 6½° included angle.

Reference numeral 27 indicates the connection for connecting the pulsator (not shown) with the annular pulsation space 29 formed between the liner 12 and its casing 14.

Typical relative dimensions and thicknesses of the various parts will be apparent from the Figure which, as already mentioned, is drawn accurately to scale with an upper liner section of length A equal to 115 mm and an expanded lower liner section 23 of length B equal to 69 mm.

Turning now to FIG. 2 of the drawing, this shows a modification in which barrel part 21 of the liner now includes a portion 31 of reduced wall thickness. This latter portion is sufficiently flexible to be able to respond to changes in pulsation chamber vacuum occurring during the pulsation cycle. In operation, portion 31 serves to enhance liner adhesion, to provide a degree of teat stimulation and to encourage blood flow within the teat.

The flexibility and inflexibility of the different parts of the liners which have been discussed above with reference to the drawings, arise from the different wall thicknesses of these parts and it will be appreciated that the permissible ranges of wall thickness required to achieve these differing qualities will be determined by the elasticity of the material (or materials) from which the liner is constructed. The wall thicknesses shown in the scale drawings assume the liner to be made of currently conventional materials for this purpose e.g. silicone rubber of nitrile rubber or a blend of rubbers with nitrile as a major component.

The all-important axial dimensions of the liner (and its casing) will, however, be unaffected by such factors.

For Fresian cows, whilst a 100 mm or 110 mm length for Section A would deal with most or the vast majority of cases, the illustrated embodiment with its 120 mm section should be able to deal with virtually all of them (120 mm being longer than the longest teat).

It might conceivably prove desirable, in some cases, to allot a different value to dimension A (although this is not thought likely) to deal with any breeds having a significantly greater or lesser average teat length than Fresian cows.

It might also be advantageous go produce a range of liners with bore diameters different to those illustrated in the drawings so as to be able to fit them more snugly on to different breeds of cow.

Details of the hydraulic milking apparatus in which the milking cup assembly of the present invention may be used are described and illustrated for example in patents GB 2159685 and GB 2192324, and the corresponding overseas patents.

It should be noted that the absence of excessively high vacuums in the liner cores and the liner's operational independence from teat size means that the vacuum changes in the liner will largely replicate those in the pulsation chamber e.g. they alternate from near-atmospheric pressure in the rest (maximum pressure) phase of pulsation to a stable 50–55 kPa vacuum throughout the milk flow phase. Since, as a result, no excessive pressure is exerted on the teat ends with such a system, vacuum-relieving milk flow from the teat can commence at the beginning of the liner opening phase of the pulsation cycle irrespective of the quarter flow rate etc. Moreover as the volume change in the liner during pulsation is effectively restricted to that portion of the liner remote from the teats, milking performance is substantially unaffected by the size of the teats. Thus further advantages of the liners of the present invention are that conditions beneath the teat are standardised irrespective of teat dimension, teat penetration into liner, quarter flow rate, milk lift from claw to recorder jar, or the inherent flow characteristics of the teat. Efficient milking of malformed or damaged teats (off-centred orifices) is also facilitated although with known hydraulic milking systems these have normally hampered initiation of milk flow.

Effective pulsation is adjudged necessary in all present day automatic milking machines to minimise the risk of teat damage such as oedema, congestion and petechial haemorrhages. To achieve effective pulsation with a conventional milking equipment pulsation cycle, the liner should apply a compressive load which is the pressure equivalent of 10 kPa on the teat end for a minimum of 0.15 seconds while the vacuum level moves from, say, 20 kPa to, say, 50 kPa. This compression load is used to modulate milk flow above the isometric point of longitudinal contraction of teat tissue. With the hydraulic milking apparatus of the present invention, however, this load is applied through the liner when the level of vacuum within the liner is depressed to near atmospheric pressure during the 'rest' phase of pulsation and the harmful effects associated with the high compressive teat loads and high milking vacuum is largely avoided.

The invention should not compromise the other benefits gained by hydraulic milking systems. These include (i) the prevention of bacterial cross contamination (teat to teat) during milking; (ii) decreased damage to milk (reduced lipolysis); (iii) reduced 'foaming'; and (iv) easier and more accurate metering and measurement of milk and milk components.

For the avoidance of doubt, it should be noted that even when the flexible lower section (23) of the liner 12 is fully collapsed, there is still some communication with the teat end through the folds of the liner whereby vacuum may be re-applied to the teat end at the beginning of the next milking phase.

To enable the illustrated embodiments of the present invention to be used more satisfactorily with even the slowest milking cows, it may be desirable to restrict milk flow from the teat liners e.g. by reducing the bores of the short milk tubes. This has the effect of slowing down the flow of milk from the liner cores so as to ensure that the period of near-atmospheric pressure occurring within the liner cores is maintained for a sufficient duration (e.g. 0.15 seconds per pulsation cycle) to minimise the risk of oedema etc.

Although intended primarily for hydraulic milking, it is envisaged that the teat liners and teat cups of the present invention might be used with advantage in a conventional milking system.

Throughout the specification the term 'cows' should not be narrowly interpreted but should be taken to include heifers and newly-calved animals.

I claim:

1. A teat cup liner for use in a hydraulic milking apparatus, the teat cup liner comprising an upper section adapted to encircle a teat with at least a lower portion of said upper section sufficiently inflexible so as not to collapse on the teat end during milking, and a relatively flexible lower section located beneath and spaced from the teat end and adapted to open and close during a pulsation cycle but not to collapse on the teat end, wherein the upper section of the liner defines a downwardly tapering bore which subtends an included cone angle of between 5° and 10°.

2. A teat cup liner as claimed in claim 1 in which the upper section of the liner is at least 100 mm long.

3. A teat cup liner as claimed in claim 1 in which the upper section of the liner has a length of between 110 mm and 120 mm.

4. A teat cup liner as claimed in claim 1 in which the liner includes a liner mouthpiece, wherein the upper section of the liner includes a flexible part adjacent to the liner mouthpiece and adapted to displace in response to changes in the pulsation chamber to enhance liner adhesion, to provide a degree of teat stimulation and to encourage blood flow within the teat.

5. A teat cup liner as claimed in claim 1 in which a core diameter of the lower liner section is greater than a core diameter of a preceding portion of the liner.

6. A teat cup liner as claimed in claim 5, in which the internal volume of the lower liner section lies in the range 25 cc to 40 cc.

7. A teat cup comprising a liner according to claim 1, in combination with a corresponding profiled rigid casing in which the liner is housed.

8. A teat cup as claimed in claim 7 in which a core diameter of the lower casing section is greater than core diameter of a preceding portion of the casing to avoid liner/casing contact during liner collapse.

9. Hydraulic milking apparatus including a cluster of teat cups as claimed in claim 7 of claim 8.

10. A method of hydraulic milking using a liner, the method including the step of periodically reducing an amount of vacuum in a liner core below a teat end to near atmospheric pressure thereby to inhibit a flow of milk from a cow's teat without collapse of the liner on the teat end.

* * * * *